United States Patent
Lewis et al.

(10) Patent No.: US 8,542,732 B1
(45) Date of Patent: Sep. 24, 2013

(54) VIDEO ENCODER USING GPU

(75) Inventors: Brian G. Lewis, Portland, OR (US); Jesse J. Rosenzweig, Portland, OR (US)

(73) Assignee: Elemental Technologies, Inc., Portland, OR (US)

( * ) Notice: Subject to any disclaimer, the term of this patent is extended or adjusted under 35 U.S.C. 154(b) by 1039 days.

(21) Appl. No.: 12/342,145

(22) Filed: Dec. 23, 2008

(51) Int. Cl.
 H04N 7/12 (2006.01)
 H04N 11/02 (2006.01)
 H04N 11/04 (2006.01)
 H04B 1/66 (2006.01)

(52) U.S. Cl.
 USPC ............ 375/240.1; 375/240; 375/240.28

(58) Field of Classification Search
 USPC ............................ 375/240, 240.01
 See application file for complete search history.

(56) References Cited

U.S. PATENT DOCUMENTS

| | | | |
|---|---|---|---|
| 6,148,027 A * | 11/2000 | Song et al. | 375/240 |
| 7,747,086 B1 * | 6/2010 | Hobbs et al. | 382/232 |
| 2007/0081587 A1 * | 4/2007 | Raveendran et al. | 375/240.1 |

* cited by examiner

*Primary Examiner* — Edan Orgad
*Assistant Examiner* — Jahangir Kabir
(74) *Attorney, Agent, or Firm* — Christopher P. Maiorana, PC

(57) ABSTRACT

An apparatus comprising a graphics processing unit, a processor and a memory. The memory stores computer executable instructions. The computer executable instructions use (i) the graphics processing unit to perform prediction, decimation, transformation and quantization, and inverse-quantization and inverse-transformation and (ii) the processor to perform entropy encoding and rate control.

20 Claims, 5 Drawing Sheets

VIDEO ENCODER USING GPU

FIELD OF THE INVENTION

The present invention relates to video compression generally and, more particularly, to a method and/or architecture for a video encoder using a graphics processing unit (GPU).

BACKGROUND OF THE INVENTION

In order to conserve storage space and transmission bandwidth, video streams are encoded (or compressed). Existing compression standards for encoding video streams include H.264 or MPEG-4 Part 10 (defined in ISO-IEC 14496-10). H.264 compression uses an enormous amount of computations to create a quality encoding of an input video stream. Many of these computations can be carried out in parallel, and some must be carried out in series.

It would be desirable to implement a system that performs computations quickly to accomplish high definition video encoding in real-time.

SUMMARY OF THE INVENTION

The present invention concerns an apparatus comprising a graphics processing unit, a processor and a memory. The memory stores computer executable instructions. The computer executable instructions use (i) the graphics processing unit to perform prediction, decimation, transformation and quantization, and inverse-quantization and inverse-transformation and (ii) the processor to perform entropy encoding and rate control.

The objects, features and advantages of the present invention include providing a method and/or architecture for a video encoder using a GPU that may (i) accomplish high definition video encoding in real time, (ii) take advantage of parallel processors and serial processors in a system and/or (iii) efficiently partition an encoder functionality across sets of parallel and serial processors.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
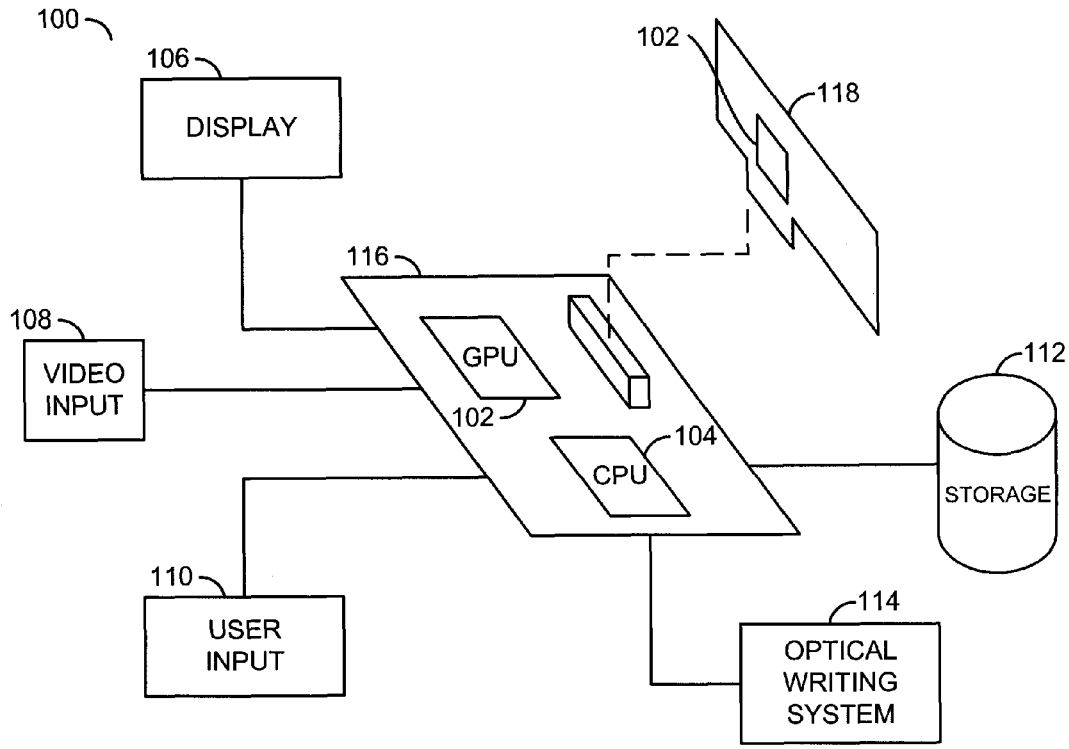
FIG. 1 is a block diagram illustrating a system for implementing an encoder in accordance with an example embodiment of the present invention.

Referring to FIG. 1, a block diagram of a system 100 is shown illustrating a context for implementing an encoder in accordance with an example of an embodiment of the present invention. In one example, an embodiment of the present invention may be implemented as a computer system 100 including both a graphics processing unit (GPU) 102 and a central processing unit (CPU) 104. The system 100 may also include, but is not limited to, an output device (e.g., display, monitor, etc.) 106, a video input module 108, an user input device (e.g., keyboard, mouse, etc.) 110, a storage device (e.g., hard drive, memory, etc.) 112 and an optical disc writing system 114. In another example, an embodiment of the present invention may implement a method for the compressing of frames of video into an H.264 encoded bitstream using (i) a GPU (Graphics Processing Unit) that includes many parallel stream processors configured in an array and (ii) a CPU to perform some of the steps in the compression.

The GPU 102 may be implemented, in one example, as a device (e.g., from NVIDIA, AMD, INTEL, etc.) mounted either on a motherboard 116 or on a card 118 that connects to the motherboard 116 via a connector 120. The GPU 102 may comprise, in one example, a plurality of parallel processors on one device. The GPU 102 may be configured to process data in parallel using the plurality of parallel processors. The CPU 104 may be implemented as one or more processors (or cores) mounted on the motherboard 116 (e.g., via a socket). An encoder (e.g., H.264, etc.) may be implemented that takes advantage of the parallel processors and the serial processors by efficiently partitioning the encoder across the processor sets.

Figure 2:
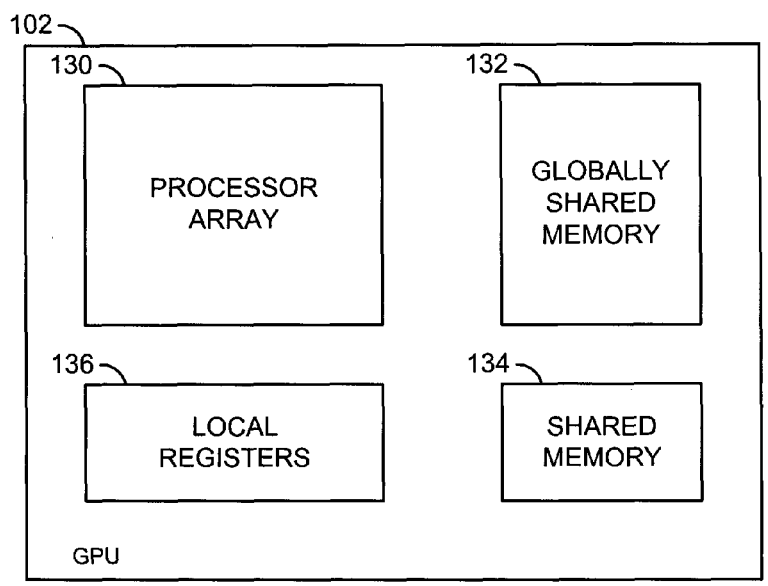
FIG. 2 is a diagram illustrating a GPU of FIG. 1.

Referring to FIG. 2, a diagram is shown illustrating an example of a GPU 102 in accordance with an example of an embodiment of the present invention. In one example, the GPU 102 may comprise an array of parallel processors 130, a globally shared memory 132, a shared memory 134 and a plurality of local registers 136. The shared memory 134 is generally implemented with faster memory than the globally shared memory 132. Each of the processors in the parallel processor array 130 may have access to the globally shared memory 132, a portion of the shared memory 134 and a number of the local registers 136. In one example, a subset of the processors in the parallel processor array 130 (e.g., 8) may share a respective portion of the shared memory 134. In general, the GPU 102 may be configured to efficiently carry out the same computation on parallel data sets. The CPU 104 may be configured to provide serial processing where serial computations are completed very quickly.

In one example, the GPU 102 may be implemented with an NVIDIA device. A general purpose parallel computing architecture such as NVIDIA® CUDA™ may be used to leverage the parallel compute engine in the NVIDIA GPU to solve many complex computational problems in a fraction of the time taken on a CPU. NVIDIA and CUDA are trademarks of NVIDIA Corporation, 2701 San Tomas Expressway, Santa Clara, Calif. 95050. The general purpose parallel computing architecture may include a CUDA™ Instruction Set Architecture (ISA) and the parallel compute engine in the GPU. To program to the CUDA™ architecture, a developer may, for example, use C, one of the most widely used high-level programming languages, which can then be run on a CUDA™ enabled processor. Other languages may be supported in the future, including FORTRAN and C++.

A GPU program may be referred to as a "Kernel". A GPU implemented with the NVIDIA device may be configured in 1 or 2 dimensional blocks of threads called CUDA blocks. The CUDA blocks may be configured in a grid of CUDA blocks when a kernel is launched. Three resources may be optimized for any given launch of a kernel: number of registers used, number of threads per block, and amount of shared memory used for each CUDA block.

Figure 3:
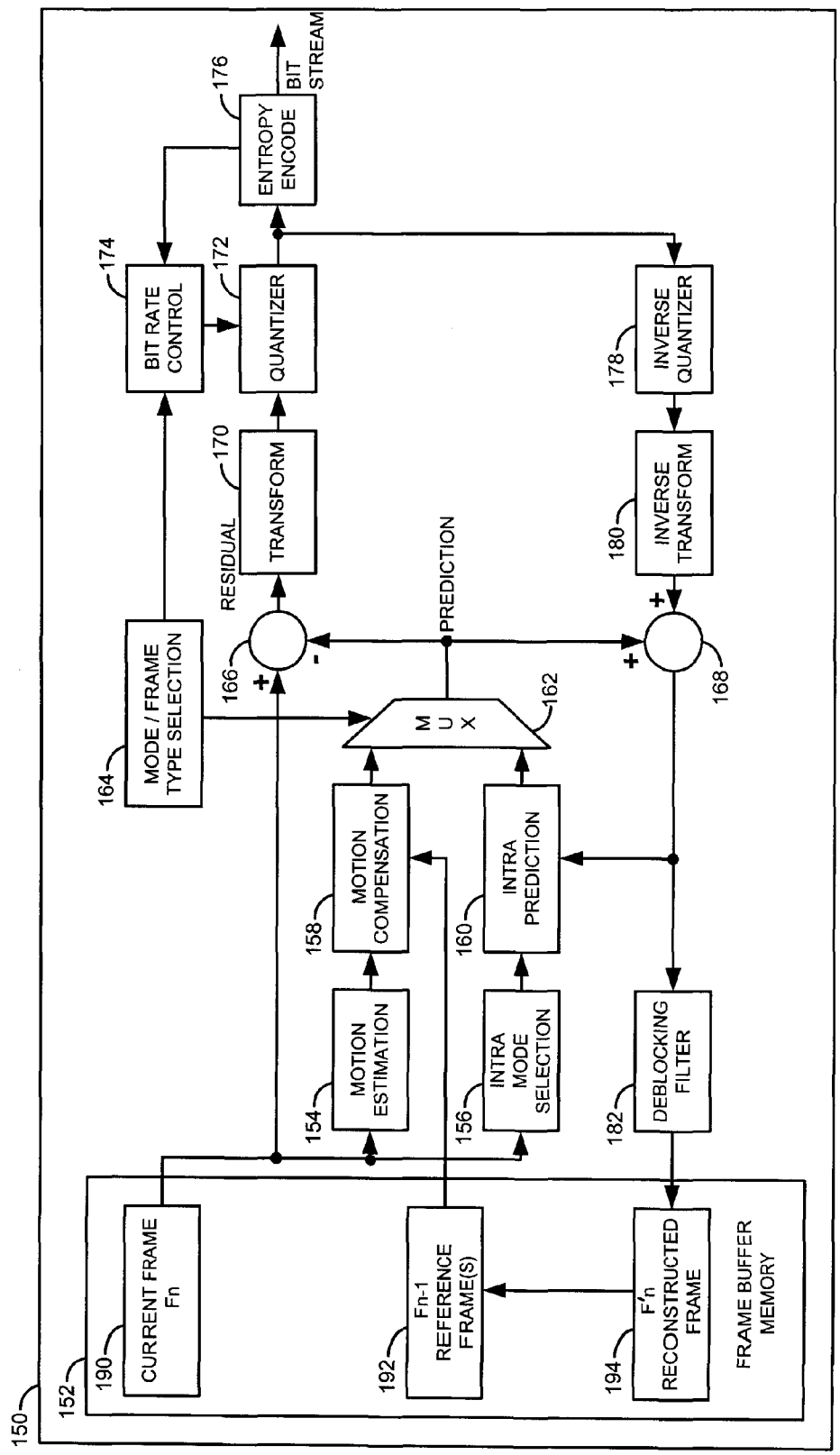
FIG. 3 is a diagram illustrating an example H.264 video encoder.

Referring to FIG. 3, a block diagram is shown illustrating an H.264 compliant encoder 150. The encoder 150 may include a module 152, a module 154, a module 156, a module 158, a module 160, a module 162, a module 164, a module 166, a module 168, a module 170, a module 172, a module 174, a module 176, a module 178, a module 180, and a module 182. The modules 152-182 may represent circuits and/or blocks that may be implemented as hardware, software, a combination of hardware and software, or other implementation.

The module 152 may be implemented, in one example, as a frame buffer memory. The module 154 may be implemented, in one example, as a motion estimation module. The module 156 may be implemented, in one example, as an intra mode selection module. The module 158 may be implemented, in one example, as a motion compensation module. The module 160 may be implemented, in one example, as an intra prediction module. The module 162 may be implemented, in one example, as a multiplexing module. The module 164 may be implemented, in one example, as a mode/frame type selection module. The modules 166 and 168 may be implemented, in one example, as adders. The module 170 may be implemented, in one example, as a transform module. The module 172 may be implemented, in one example, as a quantizer module. The module 174 may be implemented, in one example, as a bit rate control module. The module 176 may be implemented, in one example, as an entropy encoding module. The module 178 may be implemented, in one example, as an inverse quantization module. The module 180 may be implemented, in one example, as an inverse transform module. The module 182 may be implemented, in one example, as a deblocking filter.

H.264 encoding with the encoder 150 may comprise the following steps. An input frame (Fn) 190 may be stored in the memory 152. The input frame 190 may be broken up, in one example, into 16×16 blocks of luminance (Luma) pixels and associated chrominance (Chroma) pixels. The blocks of pixels are generally referred to as Macroblocks. An inter prediction (using Fn-1 reference frames) or an intra prediction (using neighbor blocks) may be calculated for each macroblock in the input frame 190 such that a residual value created by subtracting the prediction block from the input block and a cost associated with the encoding of the prediction type are minimized.

The residual pixels are calculated by the module 166 and transformed into an array of frequency coefficients by the module 170. Higher frequency components are quantized (divided) out, reducing the total number of coefficients in the block by the module 172. The block is reordered so that all 0's are at the end by using a zigzag scan of the block into a linear array. The coefficients can then be sent to the entropy encoding engine 176 which is a lossless compression step that produces the final bitstream (e.g., BITSTREAM).

The coefficients are also inverse quantized by the module 178 and inverse transformed by the module 180 in order to create a reconstructed frame (F'n) 194. The reconstructed frame 194 is generally an exact copy of the frame that the decoder will have. Optionally, the block may be filtered before storing in the frame buffer by the deblocking filter 182. The reconstructed frame 194 may be promoted to a reference frame (F'r) 192 for use in generating the prediction of the next input frame (Fn+1).

Figure 4:
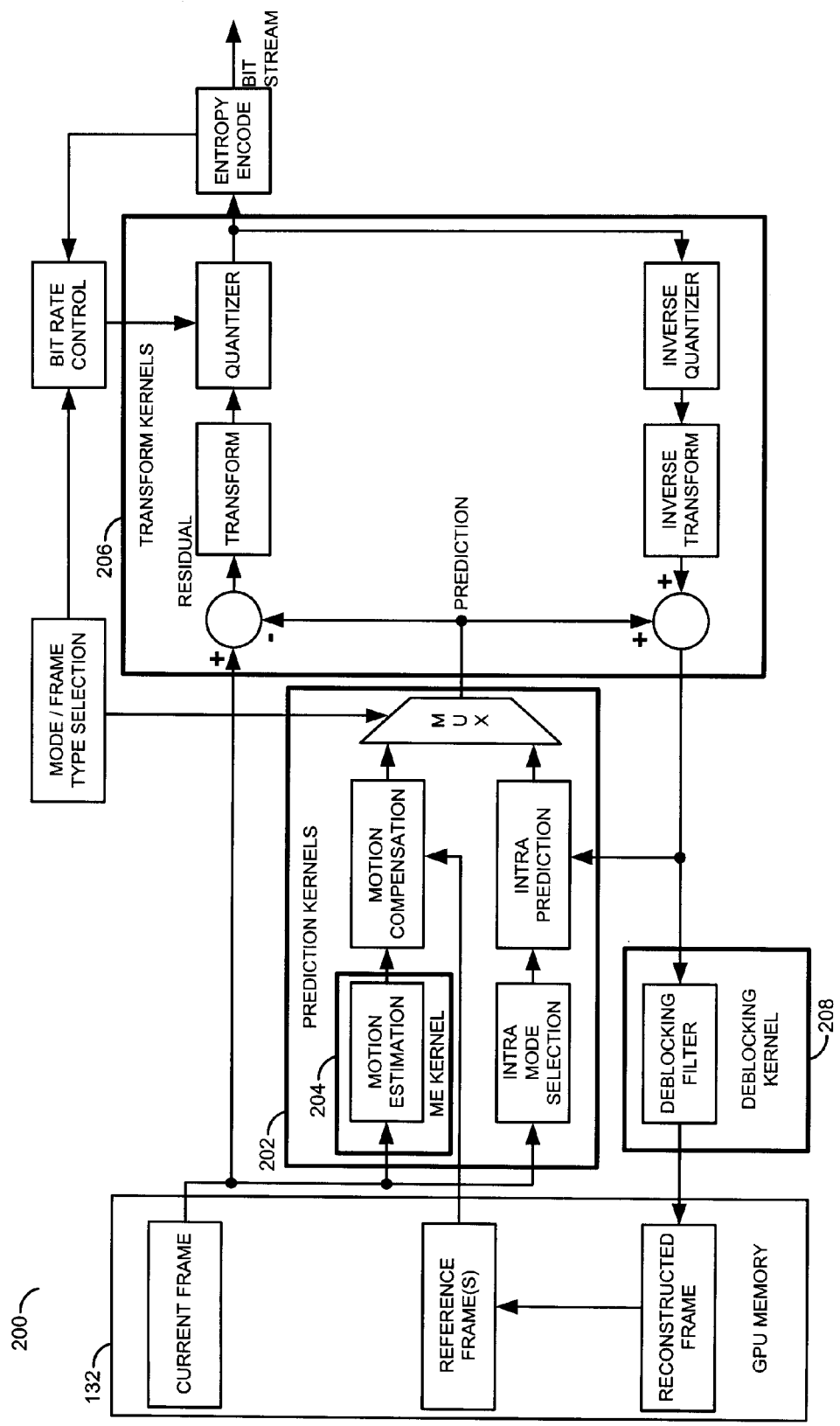
FIG. 4 is a diagram illustrating H.264 encoder and GPU kernels in accordance with a preferred embodiment of the present invention.

Referring to FIG. 4, a block diagram is shown illustrating an H.264 encoder 200 implemented with a number of GPU kernels in accordance with an example of an embodiment of the present invention. The GPU kernels are illustrated as boxes with thick lines, while elements of the encoder 150 of FIG. 3 that correspond to each kernel are generally illustrated with thinner lines within the boxes representing the kernels. To partition computation workload across the GPU 102 and the CPU 104, operations are divided between those that are parallel in nature and those that are serial in nature. As described above, all steps except for the entropy encoding engine 176 may be implemented with parallel processors.

A number of kernels may be implemented to provide the functionality of the encoder 150. In one example, the kernel designs may be divided into four categories of kernels: a prediction kernel 202, a motion estimation kernel 204, a transform kernel 206 and a filter kernel 208. The prediction kernel 202 generally determines the best prediction for each macroblock. The motion estimation kernel 204 generally performs motion estimation for each macroblock. The transform kernel 206 generally (i) transforms and quantizes each macroblock, (ii) inverse-quantizes and inverse-transforms each macroblock and (iii) creates a reconstructed picture. The filter kernel 208 generally performs a deblocking filter on the macroblocks and stores result as the reconstructed picture (F'n). The filter kernel 208 is optional.

The frames 190-194 (e.g., Fn, F'n, and Fn−1) may be stored in the globally shared memory 132 of the GPU 102. Keeping frames in the GPU memory generally avoids copying the frames back and forth to the CPU. In one example, a special purpose texture cache may be used (e.g., in the NVIDIA GPU case) to read from the frames. The texture cache and interpolation hardware generally benefits the encoder by supporting:

2 dimensional cache providing faster consecutive 2D reads from the globally shared memory 132;

Pixel replication to save inner loop conditional code/cycles during motion estimation or motion compensation;

Bi-linear interpolation for creating decimation images and estimating sub-pixel values.

Figure 5:
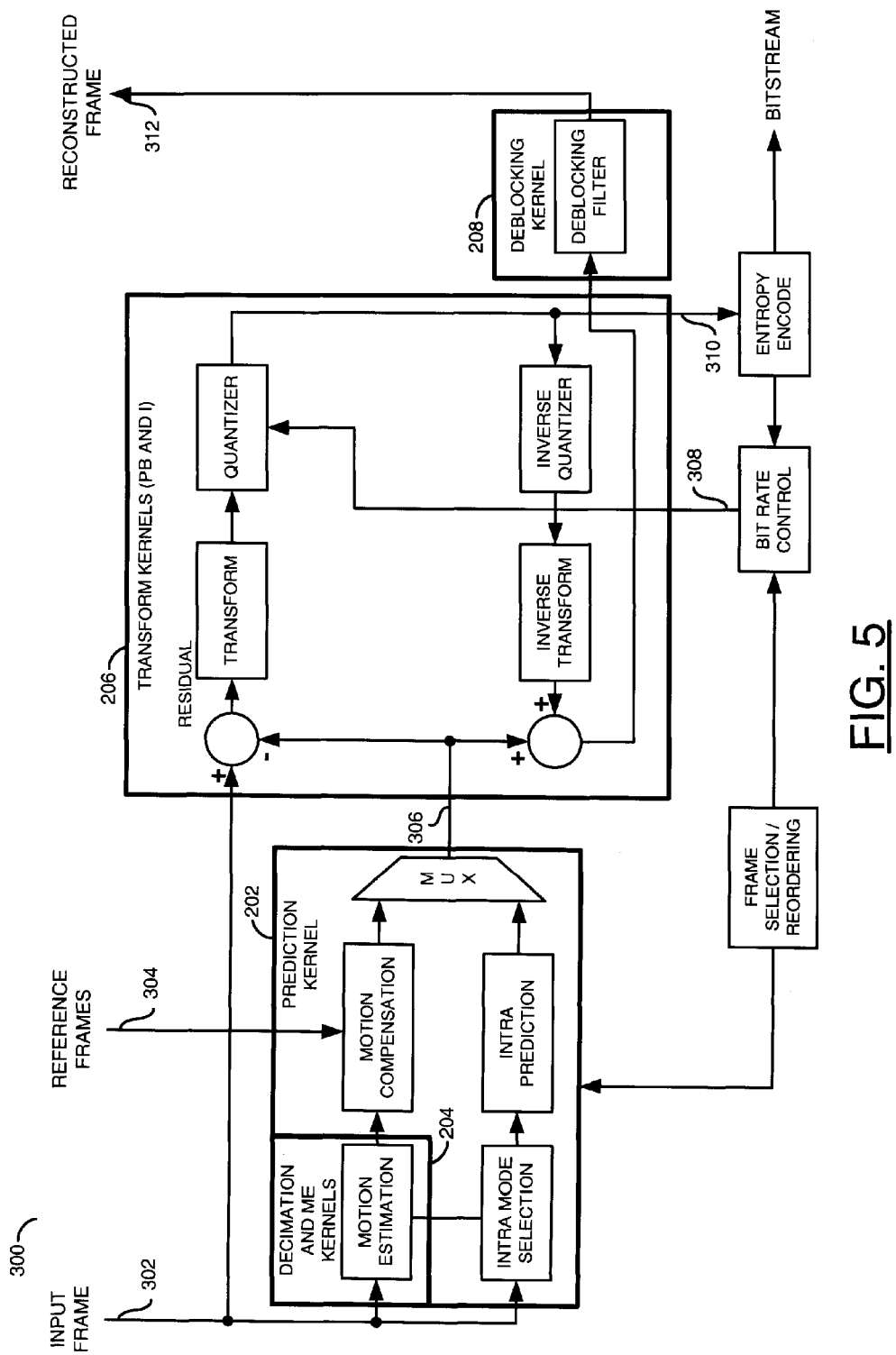
FIG. 5 is a diagram illustrating details of the kernels of FIG. 4.

Referring to FIG. 5, a diagram 300 is shown illustrating example kernels in accordance with example embodiments of the present invention. In one example, the motion estimation kernels 204 may include a decimation kernel and a search (or motion estimation) kernel. The decimation kernel may receive an input frame (Fn) 302 and a reference frame (F'r) 304 as inputs and produce several versions of the frames Fn and F'r (reference frames) with smaller resolutions in order to support a search in parallel for the best full pel motion vector. The decimation kernel decimates the input frame 302 and reference frames 304 into a number of levels. Decimation is always a square of a power of two. In one example, (1<<uLevel) squared may be the number of pixels averaged into a single value at a given level of the hierarchy. For example, uLevel=2 means 4×4 decimation (e.g., 16 pixels averaged to a single value). The decimation kernel generally reads from the appropriate global memory buffers and stores a number of decimated versions of the frame in the globally shared memory 132 of the GPU 102. Each decimated image (e.g., Fnd and F'rd) may be stored at a different offset (e.g., Input, Ref0, Ref1). The number of levels may be determined, for example, by the resolution and possibly the relative motion of the video. The decimation kernel may be used to prepare blocks for parallel pyramid search.

The motion estimation (ME) kernel may be implemented, in one example, as a hierarchical (or pyramid) search. For example, the ME kernel may iteratively search all macroblocks (in parallel) for the best full pixel motion vector using, in one example, a hexagonal search technique. Each of the decimated versions of the frames Fn and F'r (e.g., Fnd and F'rd) may be searched. Motion vectors per block and per partition, and sum of absolute differences (SAD) for each partition at the selected motion vectors may be output to the next phase.

The prediction kernel 202 generally refines motion estimation to full-pel, half-pel and quarter pel. The prediction kernel 202 also optimizes a motion vector towards a predicted motion vector to reduce encoding cost. The prediction kernel 202 also creates intra prediction and chooses best prediction modes based on overall encoding cost. The prediction kernel 202 returns information to the CPU 102. All blocks are processed in parallel. However, some blocks may wait until others are complete to optimize motion vectors. Output 306 from the prediction kernel 202 generally comprises metadata for each block. In one example, the metadata may include prediction mode, motion vector, intra and inter block partitioning. The rate control 308 implemented in the CPU 102 then selects an average quantization parameter (QP) target for the transform kernel 206. Output 310 of the transform kernel 206 generally comprises coefficients for entropy encoding into a CABAC or CAVLC bitstream.

The transform kernel 206 may comprise a transform_PB kernel and a transform_I kernel. The transform_PB kernel may perform forward transformation and quantization, inverse-quantization and inverse-transform for all P and B blocks in parallel. All coefficients and metadata for previously decided P and B blocks in the input frame Fn are generated in the transform_PB kernel.

The transform_I kernel may perform forward transformation and quantization, inverse-quantization and inverse-transformation for all I blocks in a diagonal sweep pattern that ensures macroblock dependencies for all I blocks. A diagonal sweep pattern that may be used is described in a co-pending U.S. patent application Ser. No. 12/189,735, entitled "A Method for Efficiently Executing Video Encoding Operations on Stream Processor Architectures," filed Aug. 11, 2008, which is herein incorporated by reference in its entirety.

The filter kernel 208 generally filters all macroblocks in parallel as defined in ISO-IEC 14496-10:8.7. An example of a deblocking filter that may be used to implement the filter kernel 208 can be found in the co-pending U.S. patent application Ser. No. 12/342,229, entitled Method of Efficiently Implementing a MPEG-4 AVC Deblocking Filter on an Array of Parallel Processors, filed concurrently, which is herein incorporated by reference in its entirety. Output 312 from the filter kernel 208 generally comprises the reconstructed frame.

Figure 6:
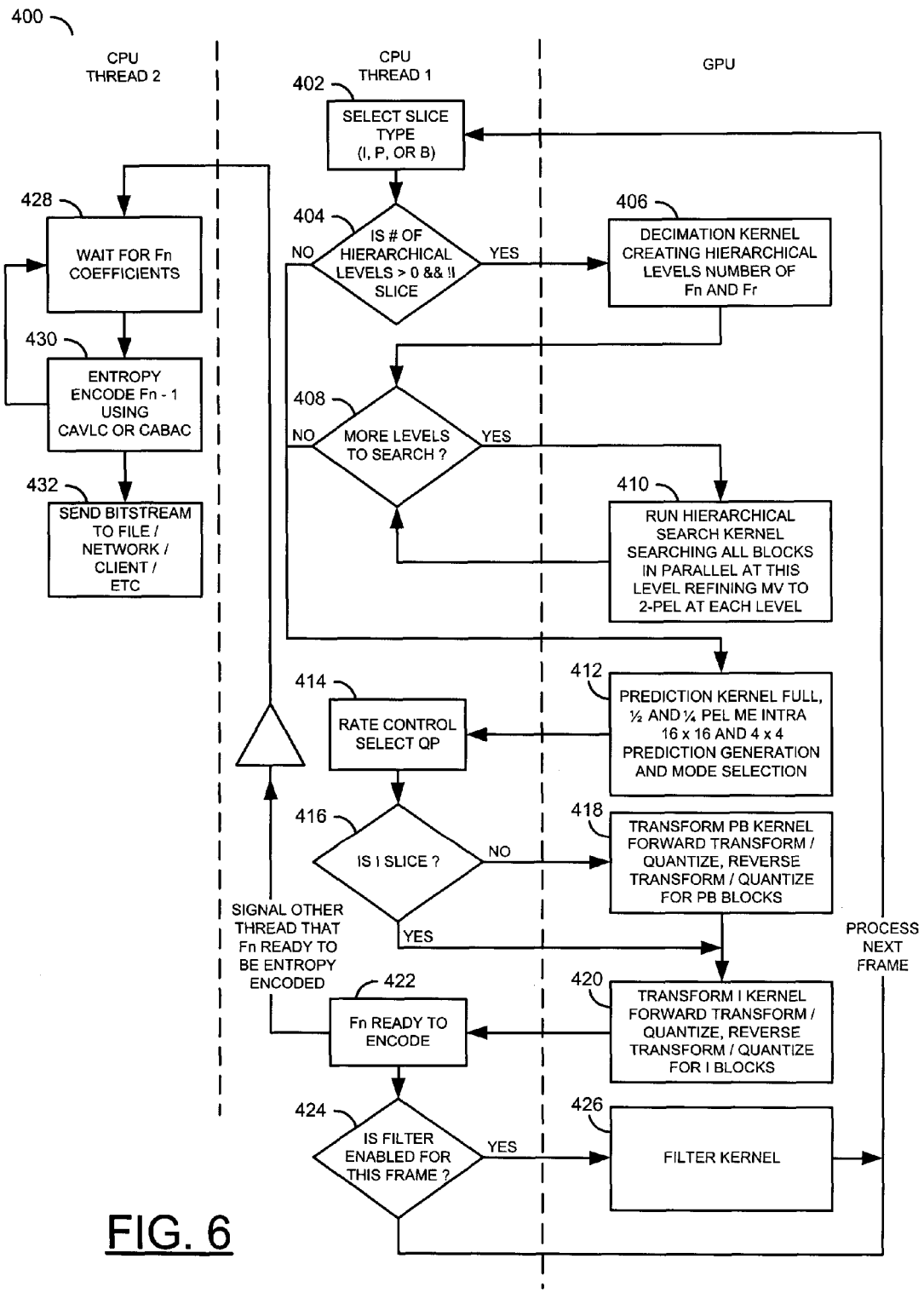
FIG. 6 is a flow diagram illustrating an example partition of an encoder functionality across sets of parallel and serial processors in accordance with a preferred embodiment of the present invention.

Referring to FIG. 6, a flow diagram is shown illustrating an example encoding process 400 in accordance with a preferred embodiment of the present invention. In one example, the process 400 may implement an H.264 compliant encoder using multiple GPU threads and two CPU threads. The use of two CPU threads generally allows concurrent processing of the coefficients for entropy encoding into a CABAC or CAVLC bitstream. The two CPU threads also allow the management of the GPU kernels, as well as rate control. The process 400 generally allows the entropy encoding of one frame while the GPU 102 is processing another frame.

In one example, the process 400 may comprise a step 402, a step 404, a step 406, a step 408, a step 410, a step 412, a step 414, a step 416, a step 418, a step 420, a step 422, a step 424, a step 426, a step 428, a step 430, and a step 432. Each of the steps 402-432 may be implemented as a step, a process, a subroutine, a state in a state machine/diagram, or another type of step/state and/or process and/or state.

The process 400 generally begins with the step 402. The step 402 selects the slice type to process. In one example, a slice may be equivalent to one picture. However, slices representing other portions of the picture may be processed accordingly to meet the design criteria of a particular implementation. When the slice type has been selected, the process 400 moves to the step 404. The step 404 determines whether or not the slice is an intra type slice. When the slice type is not an intra slice, the process 400 may move to the step 406. The step 406 runs the decimation kernel, producing a predetermined number of hierarchical levels of decimated frames for the current frame and reference frames. The number of levels may be based on resolution alone. However, other factors may be used to determine the number of levels to meet the design criteria of a particular implementation.

Once the decimation kernel has been run, the step 408 determines whether all levels have been searched. If levels remain to be searched, the step 410 runs the hierarchical search kernel. The hierarchical search kernel searches all of the blocks in parallel and refines the motion vectors to 2-pel at each level. Full pixel motion estimation may begin on every block in the picture in parallel with the hierarchical search kernel. The searches may be sequentially performed at each level for each macroblock and motion vectors are refined as level 0 is approached.

When either (i) the hierarchical search kernel finishes (e.g., no more levels to search) or (ii) the step 404 determined the slice is an intra slice, the process 400 moves to the step 412. The step 412 runs the prediction kernel to refine the 2-pel motion vectors to full-pel, half pel and quarter pel motion estimation. The prediction kernel may also optimize vectors towards predicted motion vectors to reduce encoding cost as much as possible. Intra block encoding types may also be tested in the prediction kernel to determine the best encoding mode. In one example, various overall cost thresholds may be predetermined. If either of the encoding modes satisfy the various overall cost thresholds, testing of the other mode may be omitted. The output of the prediction kernel generally comprises cost information. The output of the prediction kernel may be sent into the rate control step 414.

The rate control step 414 chooses a target QP value for the frame. The target QP value for the frame is sent to the transform kernels (e.g., transform_PB and transform_I). When the target QP values have been chosen, the step 416 determines whether the slice being encoded is an I slice. When the slice being encoded is not an I slice, step 418 runs the transform_PB kernel to generate coefficients for all P and B blocks in the slice. When the slice being encoded is an I slice, the step 418 may be skipped. When the transform PB kernel is finished or the slice being encoded is an I slice, the step 420 runs the transform_I kernel for all slices to generate coefficients for all I blocks in the picture. Once the coefficients are determined for the slice, the process 400 moves to the step 422 in the first CPU thread. The step 422 signals the other CPU thread that is in charge of entropy encoding that encoding may be started. The step 422 also signals the step 424 to determine whether the slice is to be filtered.

If the filter should be run on the slice, the step 426 launches the filter kernel. Conditions that would cause the filter kernel not to be run may include, but are not limited to, (i) the QP value is low enough for the filter to have no effect (e.g., a QP value around 15), (ii) the filter has been disabled by the user, and (iii) the picture is not referenced (e.g., the filter is not needed because the frames will not be reference frames). When the step 424 determines that the slice is not to be filtered, the process 400 returns to the step 402 and starts over with the next frame.

Meanwhile, entropy encoding may still be occurring for the current frame on a different CPU thread. For example, the 428 in the second CPU thread may have been waiting (e.g., in an idle state) for the signal from the step 422 in the first CPU thread to start entropy encoding. When the step 428 receives the signal from the step 422, the process 400 may move to the step 430. The step 430 may entropy encode the slice (e.g., using CABAC, CAVLC, etc.). When the entropy encoding of the slice is finished, the step 432 may send the slice to the application that started the process 400. The application may save the slice to a file, stream the slice (e.g., to the internet), or decode the slice for display. The entropy encoding thread then returns to the step 428 to await the next picture.

The functions performed by the various kernels described above and illustrated in the diagram of FIG. 6 may be implemented using a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), graphics processing unit (GPU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a graphics processing unit comprising an array of software-configurable general purpose parallel processors and a globally shared memory, wherein each of the software-configurable general purpose parallel processors in said array of software-configurable general purpose parallel processors has access to said globally shared memory;
    a central processing unit;
    a first memory accessible by said graphics processing unit, said first memory storing a first set of computer executable instructions, said first set of computer executable instructions using said software-configurable general purpose parallel processors in said array of software-configurable general purpose parallel processors to perform video compression steps including prediction, decimation, transformation and quantization, and inverse-quantization and inverse-transformation involving a current frame and one or more reference frames stored in said globally shared memory; and
    a second memory accessible by said central processing unit, said second memory storing a second set of computer executable instructions, said second set of computer executable instructions using said central processing unit to perform rate control on said current frame by choosing at least one target parameter value for transformation and quantization as said video compression steps are performed by said graphics processing unit and to perform entropy encoding on said current frame in response to a signal indicating the current frame is ready for encoding.

2. The apparatus according to claim 1, wherein said first set of computer executable instructions use one or more of said software-configurable general purpose parallel processors of said graphics processing unit as a deblocking filter.

3. The apparatus according to claim 1, wherein said first set of computer executable instructions comprise a plurality of subroutines, each of said subroutines comprising computer executable instructions for performing one or more of the video compression steps including said prediction, said decimation, said transformation and quantization, and said inverse-quantization and inverse-transformation using the processor array of said graphics processing unit.

4. The apparatus according to claim 3, wherein said plurality of subroutines include a prediction subroutine, a motion estimation subroutine and a transform subroutine.

5. The apparatus according to claim 4, wherein said transform subroutine comprises a first transform subroutine for intra blocks and a second transform subroutine for inter predicted blocks.

6. The apparatus according to claim 4, wherein said plurality of subroutines further comprises a decimation subroutine.

7. The apparatus according to claim 1, wherein said first and said second sets of computer executable instructions are configured to encode a picture using one graphics processing unit thread and two central processing unit threads.

8. The apparatus according to claim 1, wherein said graphic processing unit further comprises a plurality of local registers.

9. The apparatus according to claim 8, wherein each software-configurable General purpose parallel processor has access to the globally shared memory, a portion of the first memory and a number of the local registers.

10. The apparatus according to claim 9, wherein a subset of the plurality of software-configurable general purpose parallel processors share a respective portion of the first memory.

11. The apparatus according to claim 8, further comprising:
    a texture cache providing consecutive two-dimensional reads from the globally shared memory; and interpolation hardware configured to generate decimation images and estimate sub-pixel values through bi-linear interpolation.

12. A method for encoding a frame of video comprising the steps of:

using a first set of computer executable instructions stored in a first memory that is accessible by a graphics processing unit, said first set of computer executable instructions, when executed, using an array of software-configurable general purpose parallel processors and a globally shared memory of said graphics processing unit to perform video compression steps including prediction, decimation, transformation and quantization, and inverse-quantization and inverse-transformation, wherein each of the software-configurable general purpose parallel processors in said array of software-configurable general purpose parallel processors has access to said globally shared memory and said frame and one or more reference frames are stored in said globally shared memory; and using a second set of computer executable instructions stored in a second memory that is accessible by a central processing unit, said second set of computer executable instructions, when executed, using said central processing unit to concurrently perform entropy encoding, rate control and management of said graphics processing unit, wherein said central processing unit performs rate control by choosing at least one target parameter value for transformation and quantization as said video compression steps are performed by said graphics processing unit and performs entropy encoding on the frame in response to a signal indicating the frame is ready for encoding.

13. The method according to claim 12, further comprising: using one or more of said software-configurable general purpose parallel processors of said graphics processing unit as a deblocking filter.

14. The method according to claim 12, further comprising: providing one or more subroutines stored in a computer readable medium, said one or more subroutines comprising computer executable instructions for performing said prediction, decimation, transformation and quantization, and inverse-quantization and inverse-transformation using the array of software-configurable general purpose parallel processors of said graphics processing unit.

15. The method according to claim 14, wherein said subroutines further comprise computer executable instructions for performing entropy encoding, rate control and management of said graphics processing unit using said central processing unit.

16. The method according to claim 14, wherein said subroutines comprise a first transform subroutine for intra blocks and a second transform subroutine for inter predicted blocks.

17. The method according to claim 14, wherein said first and said second sets of computer executable instructions are configured to encode a picture using multiple graphics processing unit threads and two central processing unit threads.

18. The method according to claim 14, further comprising:
using a texture cache and interpolation hardware to provide two-dimensional reads from said globally shared memory;
using a decimation subroutine to prepare frames for a parallel pyramid search; and
keeping frames in the globally shared memory of the graphics processing unit to avoid copying the frames back and forth to the central processing unit.

19. The method according to claim 12, wherein said encoding of said frame of video is H.264 compliant.

20. A non-transitory computer readable medium storing computer executable instructions comprising:

a first set of computer executable instructions, which, when loaded into a first memory that is accessible by a graphics processing unit and executed, perform video compression steps including prediction, decimation, transformation and quantization, and inverse-quantization and inverse-transformation on a slice using an array of software-configurable general purpose parallel processors and a globally shared memory of said graphics processing unit; and a second set of computer executable instructions, which, when loaded into a second memory that is accessible by a central processing unit and executed, perform entropy encoding, rate control and management of said graphics processing unit using said central processing unit, wherein said rate control is performed by said central processing unit choosing at least one target parameter value for transformation and quantization as said video compression steps are performed by said graphics processing unit and said entropy encoding is performed on the slice by said central processing unit in response to a signal indicating the slice is ready for encoding.

* * * * *